Jan. 11, 1966   D. K. FARMER   3,228,210
BI-DIRECTIONAL OVERLOAD CLUTCH
Filed Feb. 6, 1964
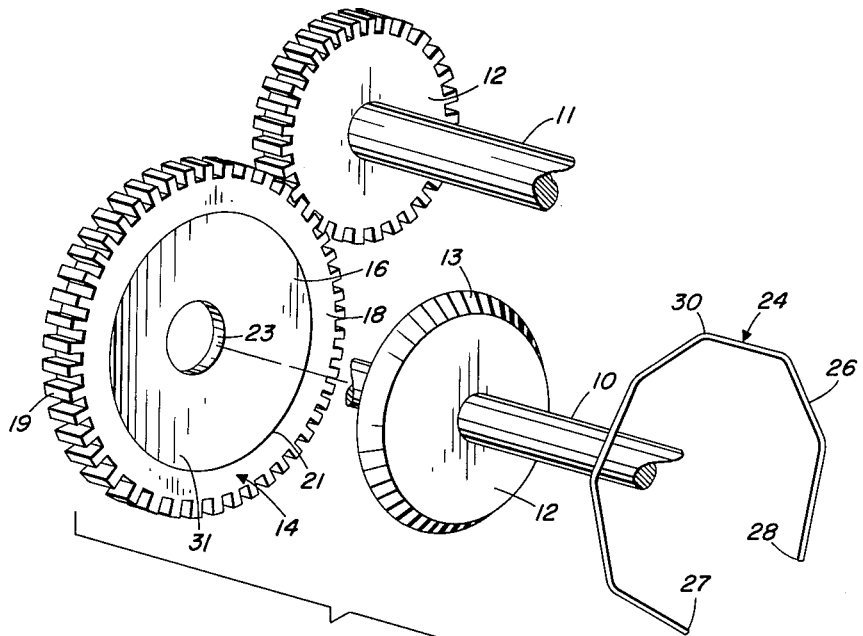
FIG 1
FIG 2
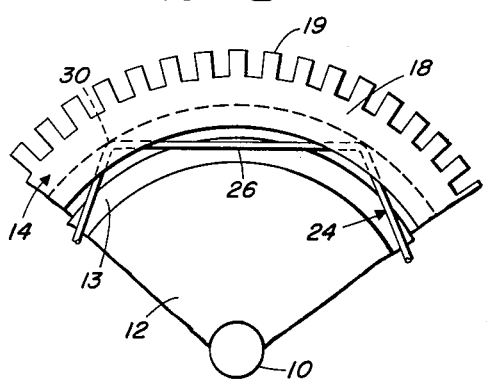
FIG 3
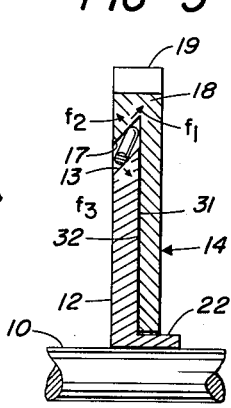
INVENTOR.
DAVID K. FARMER
BY
ATTORNEY 3,228,210
BI-DIRECTIONAL OVERLOAD CLUTCH
David K. Farmer, Cedar Rapids, Iowa, assignor to Collins Radio Company, Cedar Rapids, Iowa, a corporation of Iowa
Filed Feb. 6, 1964, Ser. No. 343,100
4 Claims. (Cl. 64—30)

This invention relates in general to clutches and in particular to a simple spring loaded overload clutch.

It is oftentimes desirable to provide an inexpensive and efficient slip-clutch to prevent overload from occurring in a drive train.

It is an object of the present invention to provide a simple, inexpensive bi-directional slip clutch.

Another object of the invention is to provide a slip clutch which has more than one frictional surface.

A feature of this invention is found in the provision for a driven and driving member formed with tapered edges between which is placed a spring clip to produce a slip clutch.

Further features, objects and advantages of this invention will become apparent from the follownig description and claims when read in view of the drawings in which:

FIGURE 1 is an exploded view of the slip clutch according to the invention;

FIGURE 2 is an enlarged partial plan view of the clutch; and,

FIGURE 3 is a sectional view taken through the clutch elements.

FIGURE 1 illustrates a first shaft 10 which may be either an input or output shaft and a second shaft 11 which also may be an input or output shaft. Shaft 10 is rigidly connected to a first clutch disc member 12. The edge of the disc 12 is formed with a beveled portion 13. A second clutch element comprises a disc member 14 which is formed with a recess 16 which, as is best shown in FIGURE 3, is undercut to form the surface 17. The largest diameter of disc 12 is smaller than the diameter of edge 21 of the undercut portion 17 so that the disc 14 can receive the disc 12 within the recess 16. The rim portion 18 of the disc 14 is formed with gear teeth 19. A gear 21 meshes with the gear teeth 19 and is supported by shaft 11. Disc 12 is formed with a collar 22 which extends through an opening 23 formed in member 14 and member 14 is rotatably supported by the collar 22.

A flexible spring member 24 is formed of a plurality of straight sections 26 and may be inserted between the beveled portion 13 of disc 12 and the undercut portion 17 of disc 14 to assemble the clutch. This is accomplished by pushing the ends 27 and 28 of the spring clip 24 together and by inserting it into the space between portions 13 and 17 and then releasing the ends 27 and 28 to allow them to expand to take the position shown in FIGURES 2 and 3. The corners 30 of the spring 24 form a lock which prevents the clutch from being disassembled unless the ends 27 and 28 of the spring are moved toward each other and the spring is removed.

This clutch has the advantages of being bi-directional, easy to assemble and capable of wide torque ranges.

The chordal sections 26 of the spring 24 contact the surfaces 17 and 13 at a point of tangency on the sloped rim and outer cage. (Vectors $F_2$ and $F_3$ in FIGURE 3.) This relationship causes a frictional force between surfaces 13 and 17, and also an axial force $F_1$ as shown in FIGURE 3.

A second frictional surface exists between the faces 31 and 32 of the discs and depending upon the required service, either or both frictional surfaces may be utilized. For light loads the whole clutch may be oiled and run at frequent intervals. Under this condition most of the friction will be caused by spring 26. For heavy services, running dry will allow the two disc surfaces 31 and 32 to engage (see FIGURE 3) to give additional frictional coupling. The frictional force between surfaces 31 and 32 as well as between the member 24 and surfaces 13 and 17 can be adjusted by the spring tension in the member 24. In other words, a stiff spring 24 will allow greater torque to be transmitted before the clutch will slip than a lighter spring.

The coupling to disc 14 is shown by a gear 12 and shaft 11 but it is to be realized, that disc 14 could be a pulley or could be mounted on a shaft which is end to end with shaft 10.

It is seen that this invention provides an improved bi-directional slip clutch which is simple and easy to construct.

Although this invention has been described with respect to a particular embodiment, it is not to be so limited, as changes and modifications may be made therein which are within the spirit and scope of the invention as defined by the appended claims.

I claim:
1. A slip clutch comprising a first member, a second member formed with a recess which is large enough to allow said first member to be received therein, said recess having a varying edge and a bottom surface, the diameter of said varying edge increasing from the outer edge to the inner edge so that the inner diameter is larger than the outer diameter, and a retaining member receivable in said recess to lock one side of said first member against the bottom surface of said recess.

2. A slip clutch comprising a first disc formed with a beveled edge such that the two sides of said first disc have different diameters, a second disc formed with a recess large enough to receive said first disc therein, said beveled edge being positioned such that the larger diameter of said first disc can engage said second disc, said recess having a tapered surface, the diameter of said tapered surface increasing from the outer edge to the inner edge, and a spring received between the first and second discs to lock the side of said first disc having the larger diameter against the recessed portion of said second disc to form a slip clutch.

3. In apparatus according to claim 2 wherein said spring comprises a plurality of straight portions connected end to end.

4. In apparatus according to claim 2 wherein a first shaft is connected to the first disc and a second shaft is connected to the second disc.

References Cited by the Examiner
UNITED STATES PATENTS
1,942,512  1/1934  Lee _____ 64—30
2,955,443  10/1960  Fulop _____ 64—28

FOREIGN PATENTS
1,084,122  6/1954  France.
836,577  6/1960  Great Britain.

BROUGHTON G. DURHAM, Primary Examiner.
H. C. COE, Assistant Examiner.